United States Patent [19]

Shimizu

[11] 4,300,390

[45] Nov. 17, 1981

[54] APPARATUS FOR DETERMINING POSITIONAL COORDINATES UTILIZING THE TERRESTRIAL MAGNETISM AS A DIRECTIONAL REFERENCE

[75] Inventor: Sachinobu Shimizu, Tokyo, Japan

[73] Assignee: Nippon Telegraph & Telephone Public Corporation, Tokyo, Japan

[21] Appl. No.: 75,421

[22] Filed: Sep. 14, 1979

[30] Foreign Application Priority Data

| Jan. 24, 1979 | [JP] | Japan | 54-6003 |
| Jan. 24, 1979 | [JP] | Japan | 54-6004 |
| Jan. 24, 1979 | [JP] | Japan | 54-6005 |
| Jan. 26, 1979 | [JP] | Japan | 54-7039 |
| Jan. 29, 1979 | [JP] | Japan | 54-8862 |

[51] Int. Cl.³ .......................................... G01C 21/20
[52] U.S. Cl. ................................. 73/178 R; 33/1 M; 33/342; 33/352; 33/361
[58] Field of Search ................ 33/356, 342, 352, 333, 33/316, 317 R, 317 D, 361, 362, 1 M; 73/178 R

[56] References Cited

U.S. PATENT DOCUMENTS

| 2,464,057 | 3/1949 | Phair | 33/356 |
| 3,183,603 | 5/1965 | Trenchard | 33/356 |
| 3,355,942 | 12/1967 | Freeman | 33/356 X |
| 3,744,312 | 7/1973 | Anderson | 33/356 |
| 3,936,949 | 2/1976 | Devand . | |
| 3,991,361 | 11/1976 | Matter et al. | 33/356 |
| 4,179,741 | 12/1979 | Rossani | 33/356 X |

Primary Examiner—William D. Martin, Jr.
Attorney, Agent, or Firm—Claude A. S. Hamrick

[57] ABSTRACT

Apparatus for determining the positional coordinates of a moving object including a plurality of magnetic field vector detecting devices, an inclination detecting device for detecting inclination of the magnetic field vector detecting devices, a distance detecting device for detecting the distance that the moving object has travelled, and arithmetic means which receives outputs from the magnetic field vector detecting devices as well as from the inclination detecting device, calculates the horizontal component force vector of the geomagnetic field by using the outputs from the magnetic field vector detecting devices and from the inclination detecting device, further calculates the vector in the progress direction of the moving object by referring to the horizontal component force vector, and integrates the product of the vector in the progress direction and the output from the distance detecting device, whereby the positional coordinates are obtained as the output of the arithmetic means, and the coordinates which have been set at an arbitrary point are replaced by the newly determined coordinates when turning to the right or left is carried out at the arbitrary point correctly as ordered.

8 Claims, 19 Drawing Figures (a)    (b)

APPARATUS FOR DETERMINING POSITIONAL COORDINATES UTILIZING THE TERRESTRIAL MAGNETISM AS A DIRECTIONAL REFERENCE

BACKGROUND OF THE INVENTION

This invention relates to an apparatus for determining positional coordinates utilizing the terrestrial magnetism as a directional reference. More particularly, the invention relates to an apparatus for determining positional coordinates and is suitably designed for installation on a small size moving object such as a land vehicle.

In comparatively large moving objects (for instance, vessels at sea and aircraft in flight), numerous methods and systems have been adopted for determining location at sea or in flight. Such systems have included the use of gyrocompasses, radio beacons, space satellites, and instruments for astronomical measurement. The apparatus and instruments used in such systems have, however, been generally constructed with large and sophisticated structure, thus resulting in high cost. Moreover, most such prior art apparatus is subject to restriction with respect to the time and place of its use. It is very hard, therefore, to apply them to smaller moving objects such as land vehicles.

The simplest systems for determining the location of a moving object have incorporated magnetic compasses which make use of the earth's magnetic field. However, when such systems or devices are used in small moving objects such as land vehicles, it has often been experienced that a large error is introduced into the measurement as a result of interferring magnetic fields originating from a magnetic body in the vicinity of the compass, or vibration of the moving object itself.

SUMMARY OF THE INVENTION

It is therefore a principal object of the invention to provide an apparatus for determining positional coordinates from which the accurate location of the moving object can be determined.

It is another object of the invention to provide an apparatus for determining positional coordinates that can be installed on a moving object, that has smaller dimensions than similar prior art devices, and that can be manufactured at low cost.

It is a further object of the invention to provide positional coordinate determining apparatus which is less influenced by the magnetic field from a magnetic body than are prior art devices.

It is a still further object to provide an apparatus for determining positional coordinates wherein the horizontal component of the geomagnetic field can be accurately obtained even when the rotary axis of the magnetic field vector detecting device is inclined.

In accordance with one aspect of the invention, for achieving the objects as mentioned above, there is provided an apparatus for determining positional coordinates of the class wherein the geomagnetic field is referred to as a directional reference and which is suitably designed to be installed on a moving object, such apparatus being characterized in that it comprises a plurality of magnetic field vector detecting devices, an inclination detecting device for detecting the inclinations of the magnetic field vector detecting devices, a distance detecting device for detecting the distance that the moving object has travelled, and arithmetic means which receives outputs from the magnetic field vector detecting devices as well as from the inclination detecting device, calculates the horizontal component force vector of the geomagnetic field using such output, further calculates the vector in the advancing direction of the moving object by referring to the horizontal component force vector, and integrates the product of the calculated vector in the advancing direction and the output from the distance detecting device. The positional coordinates are obtained as the output of the arithmetic means, which is a computer, and coordinates which have been set at an arbitrary point are replaced by newly determined coordinates when the moving body turns to the right or left.

IN THE DRAWING

Apparatus for determining positional coordinates in accordance with the present invention will now be more fully described, by way of example, with reference to the accompanying drawing, in which.

Figure 1:
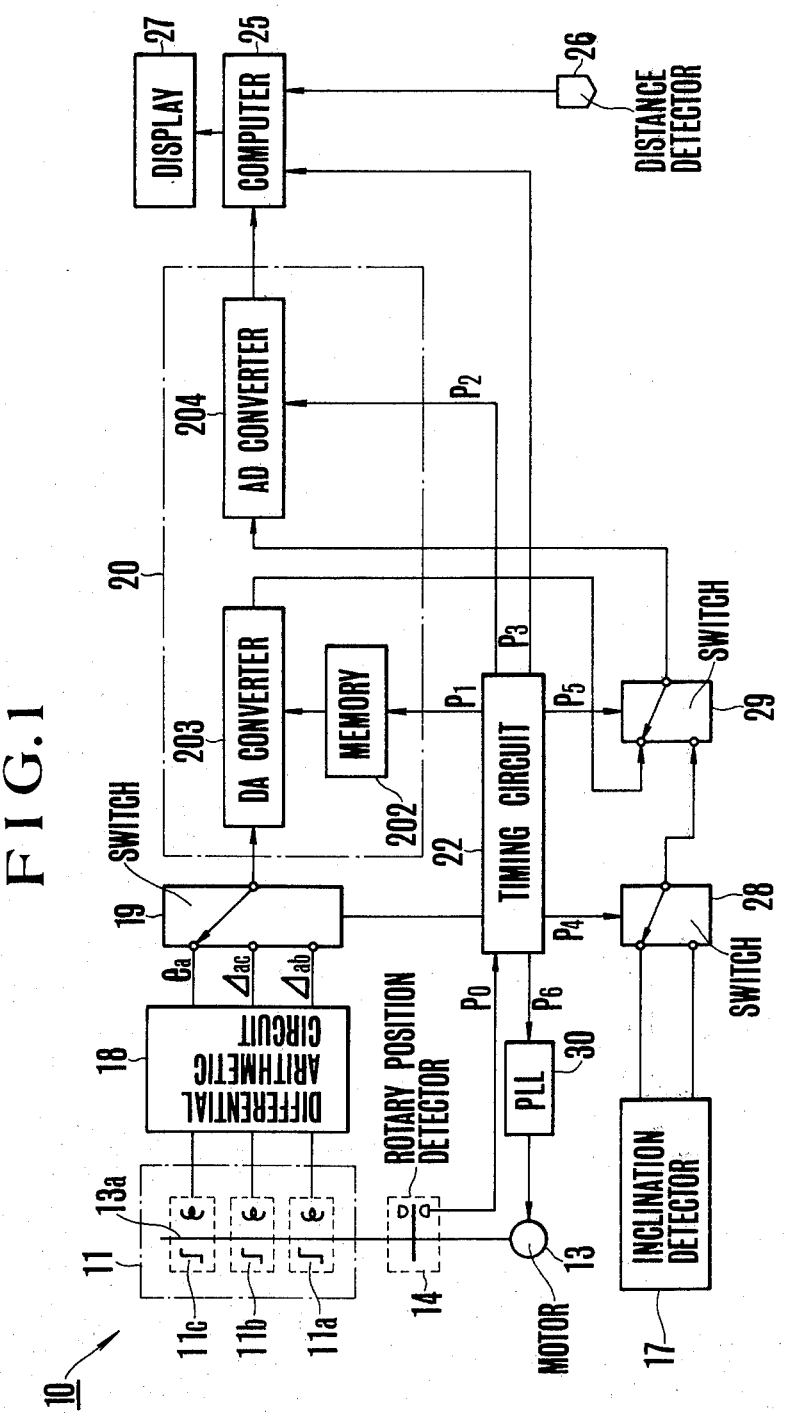
FIG. 1 is a block diagram showing an example of the apparatus for determining positional coordinates embodying the present invention.
Figure 5:
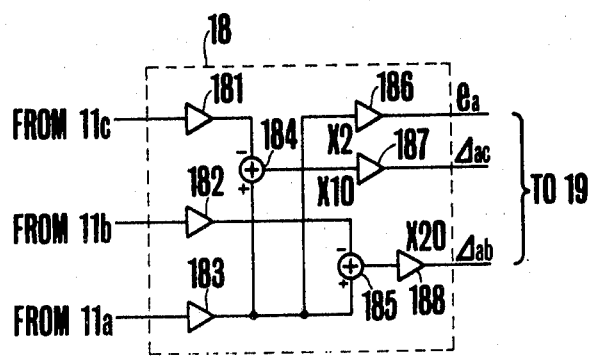
Figure 4:
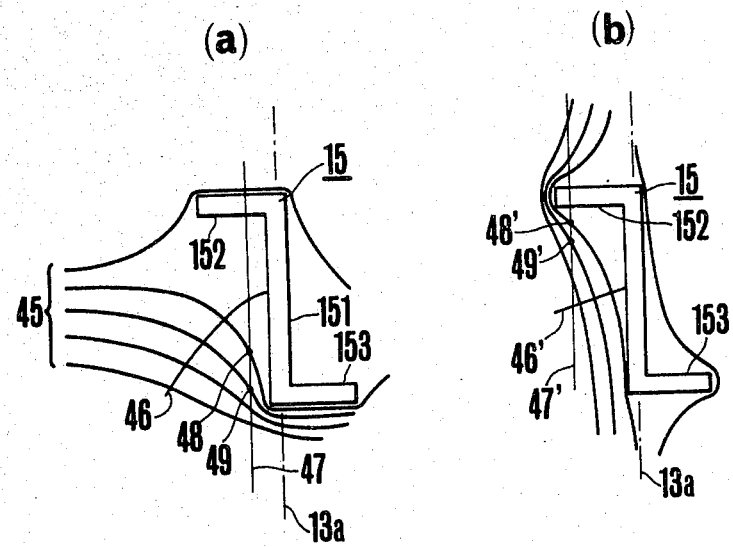
Figure 4A:
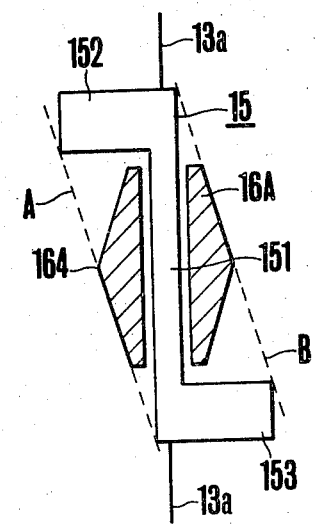
Figure 6:
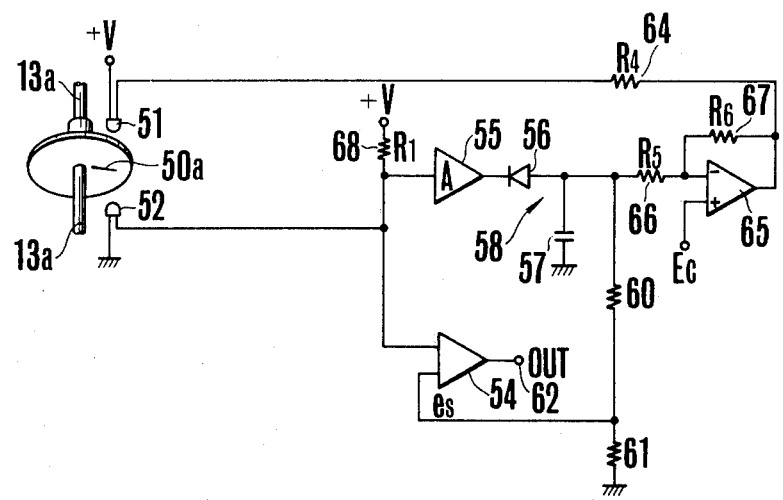
Figure 7:
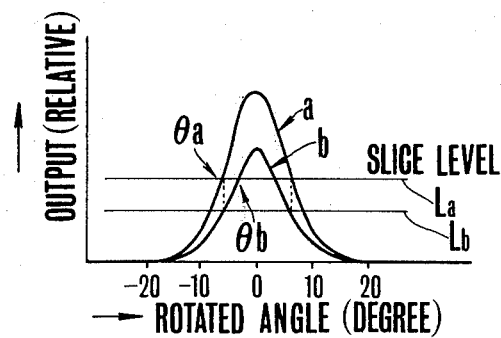
Figure 8:
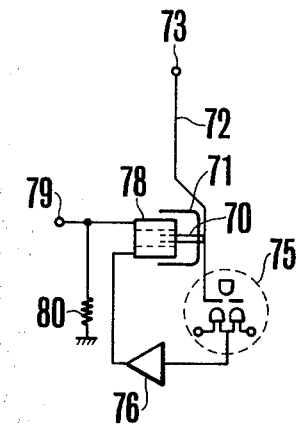
Figure 9:
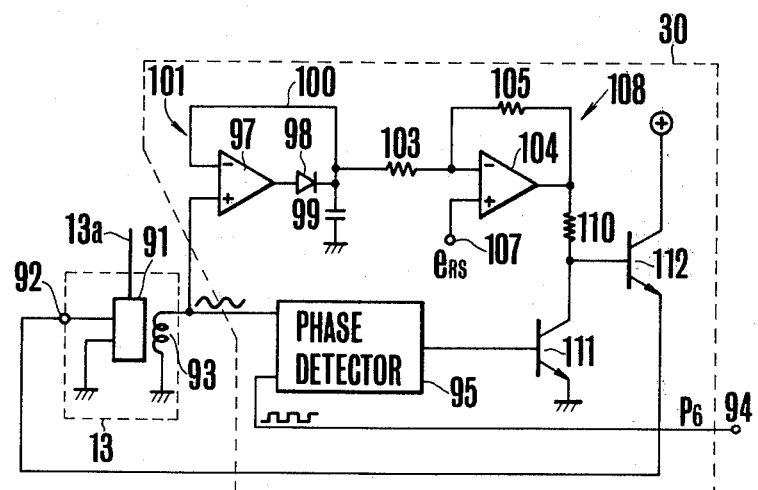
Figure 10:
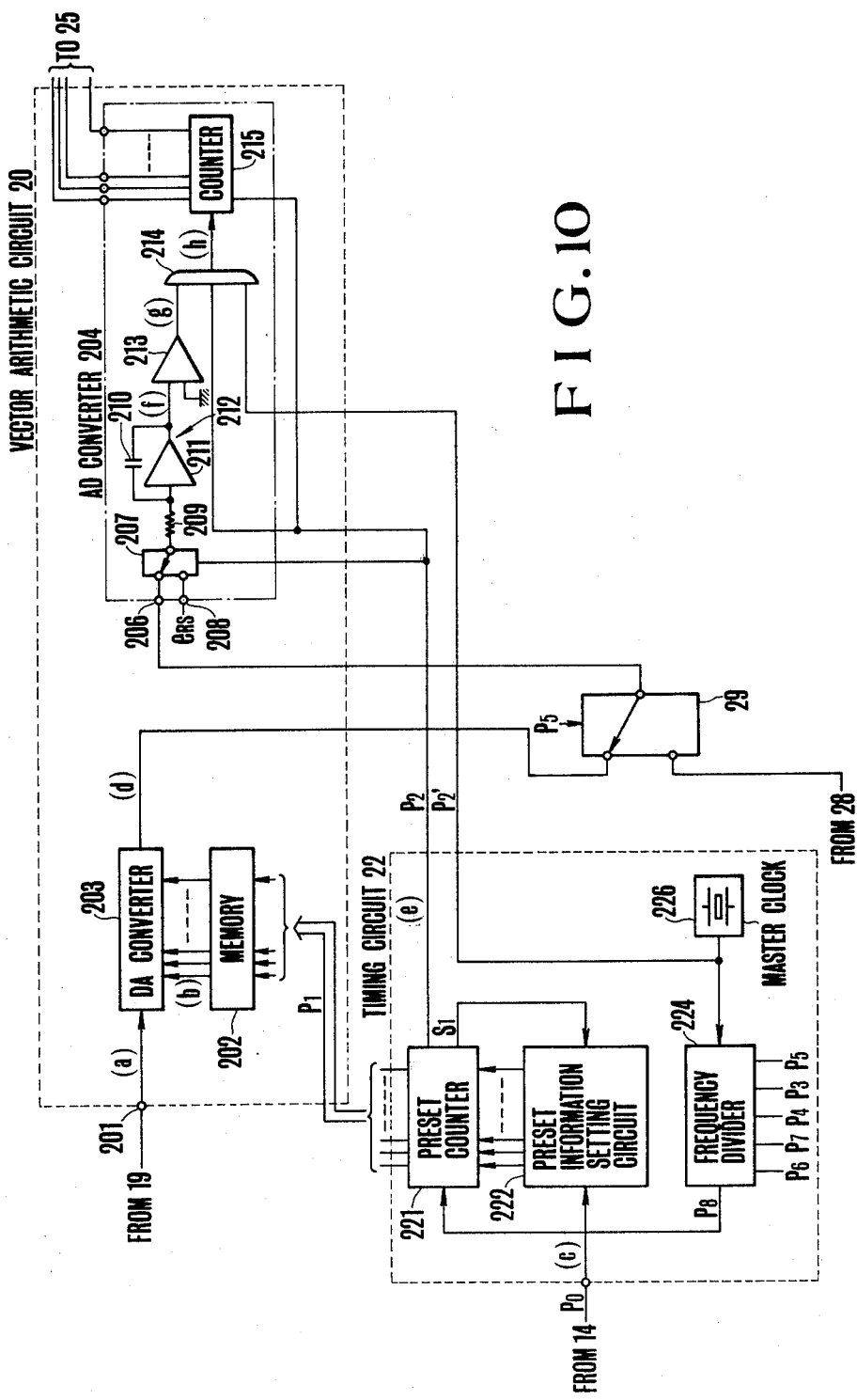
Figure 11:
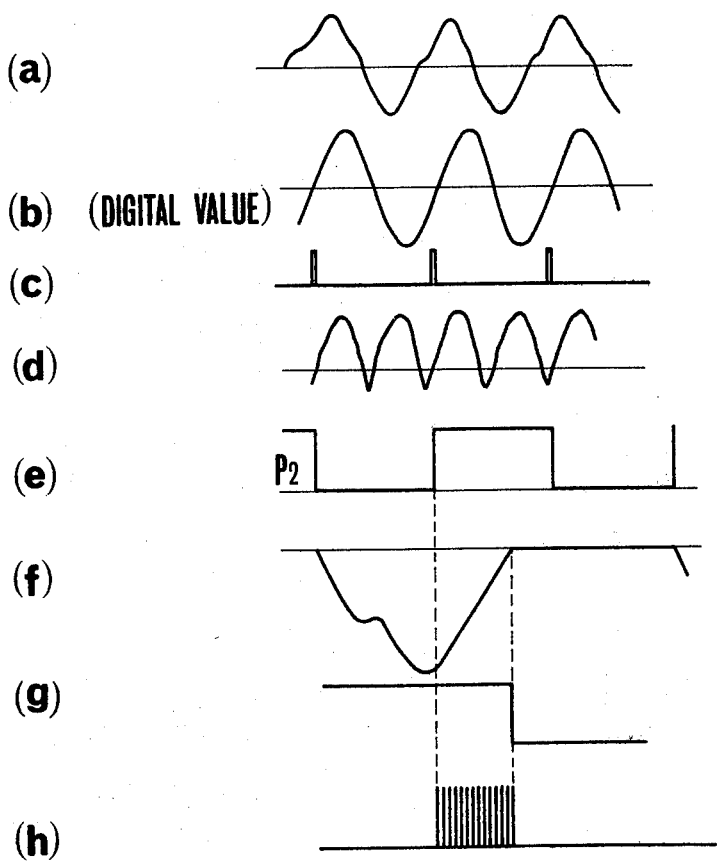
Figure 12:
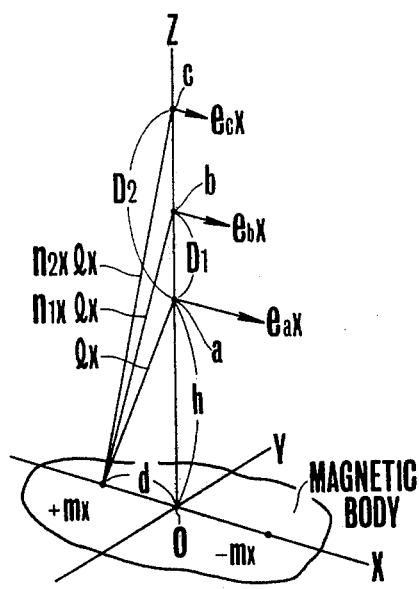
Figure 13:
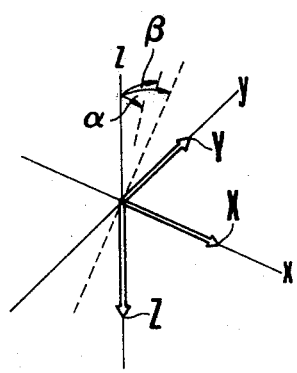
Figure 14A:
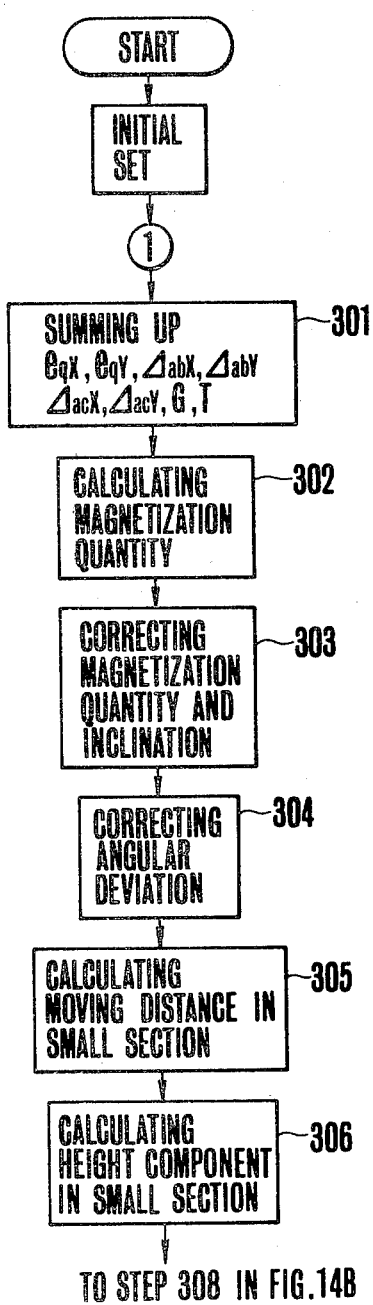
Figure 14B:
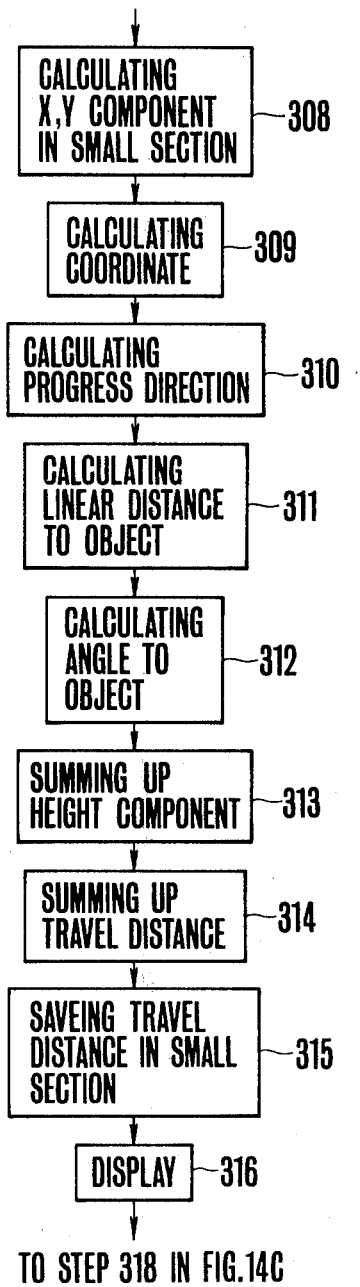
Figure 14C:
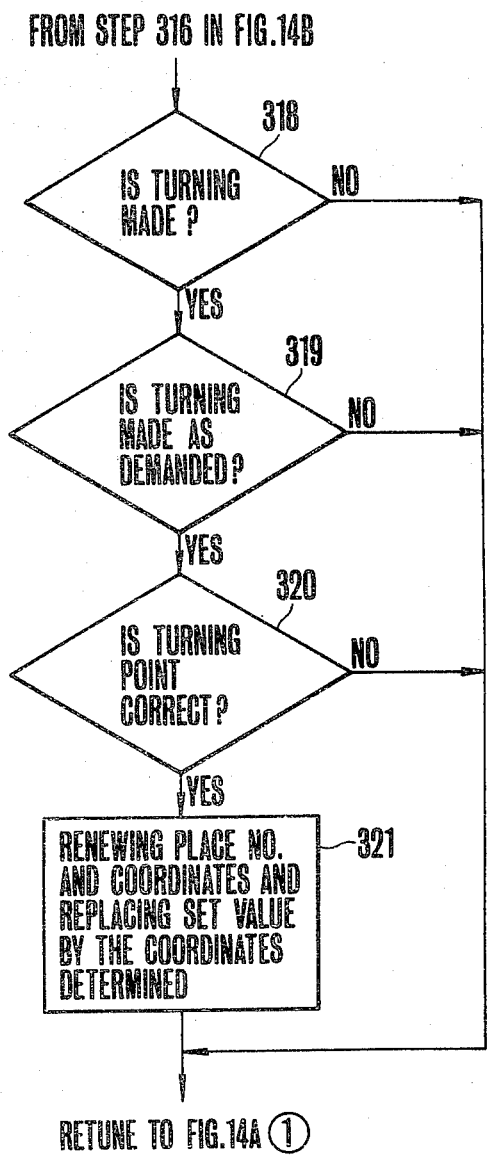
Figure 15:
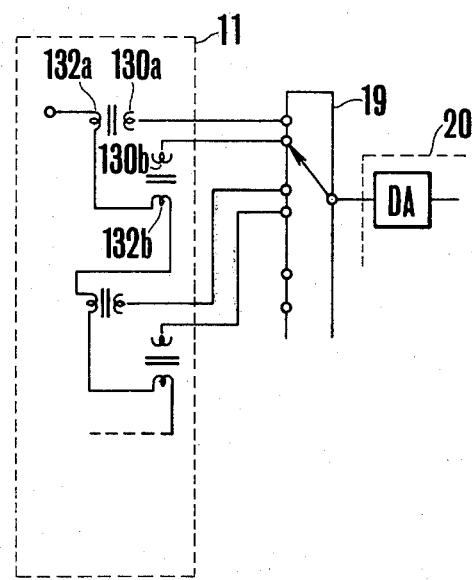

FIG. 4(a) and 4(b) are diagrams showing equi-magnetic potential distribution lines in the vicinity of the rotary magnetic piece of the magnetic field vector detecting device, and lines are drawn in terms of the vertical and horizontal components of the magnetic field vector;

FIG. 4A is a diagram showing a modified magnetic field vector device including a partly broken view of the device;

FIG. 5 is a circuit diagram showing an example of the differential arithmetic circuit that is disposed at the output side of the magnetic field vector detecting device;

FIG. 6 is a schematic diagram showing an example of the position detector having a rotary magnetic piece as shown in FIG. 1;

FIG. 7 is a graph showing the relative output characteristics of the position detector against the rotated angle of the magnetic piece;

FIG. 8 is a diagram showing the constitution of the inclination detecting device;

FIG. 9 is a schematic circuit diagram representing a synchronizing circuit as shown in FIG. 1;

FIG. 10 is a block diagram showing the principal components of the vector component arithmetic circuit along with the main part of the timing circuit;

FIG. 11 shows waveforms used in explaining the operation of the circuit shown in FIG. 10;

FIG. 12 is a diagram for use in explaining how the influence of the magnetic field caused by an external magnetic body is eliminated in the apparatus of this invention;

FIG. 13 is a diagram for use in explaining how the measured value is changed by the inclination of the magnetic field vector detecting device;

FIGS. 14A through 14C are flow charts showing an example of the arithmetic operation by the computer; and FIG. 15 is a diagram schematically showing the constitution of a modified magnetic field vector detecting device.

DETAILED DESCRIPTION OF THE PREFERRED EMBODIMENT

FIG. 1 shows an apparatus for determining positional coordinates embodying the present invention. In the figure, the apparatus 10 has magnetic field vector detecting devices 11 (11a, 11b and 11c) of the class which includes a rotary magnetic piece connected to the rotary axis 13a of a motor 13. In such magnetic field vector detecting devices 11a, 11b and 11c, each rotary magnetic piece is formed in an "S" shape and is made to rotate around the axis of a fixed coil. When the S-shaped magnetic piece is rotated, magnetic flux passing therethrough varies depending on the direction of an external magnetic field and the rotation angle of the magnetic piece. This variation in the magnetic flux is picked up as a voltage from the fixed coil surrounding the S-shaped magnetic piece. The constitution of the magnetic field vector detecting device as mentioned above is shown in FIG. 12 and will be described in more detail later. The magnetic field vector detecting devices 11a–11c are aligned on the axis 13a of the motor 13 keeping appropriate distances therebetween and are arranged to detect geomagnetic field components in the different directions on one plane.

On the rotary axis 13a of motor 13 there is also provided a rotary position detector 14 which is adapted to detect the rotation of the magnetic piece, and comprises a rotating plate with a slit which is rotated together with the magnetic piece and the light emitting and receiving elements which are disposed at both sides of the rotating plate. Full explanation on the detector 14 will be made later with reference to FIG. 6.

The apparatus 10 is also provided with an inclination detecting device 17 which detects the inclination of the magnetic field vector detecting devices 11a–11c and is capable of transmitting analog signals in correspondence with inclinations in all directions; back and forth as well as right and left. This inclination detecting device will also be fully explained later by referring to FIG. 8.

Outputs from the magnetic field vector detecting devices 11a, 11b and 11c are transmitted to switching means 19 through a differential amplifier circuit 18, which will be fully explained later in connection with FIG. 5, and a selected output is transmitted to a vector arithmetic circuit 20, which has the ability to divide the output amplitude and phase information from the magnetic field vector detecting devices into X and Y vector components using the output $P_1$ from a timing circuit 22. The output signal from the magnetic field vector detecting device includes second order higher harmonics due to nonuniform magnetic fields in the vicinity of the detecting device, high order higher harmonics due to the ripple of the motor torque and the leaked magnetic field, and noise due to mechanical vibration, all of which have to be separated from the basic save component. An analog filter is generally used for such separation. In order to decompose the output signal into the sine and cosine components, a method of measuring phase angle has been adopted. However, this method often invites error due to phase change in the filter and results in increased calculation time. In the present invention, therefore, there is provided a vector component arithmetic circuit 20 which is capable of performing separation and decomposition at the same time. The arithmetic circuit 20 basically comprises a memory means 202, a multiplying DA converter 203, and a dual slope AD converter 204. The memory means 202 is constituted such that the basic sine wave, which is digitally memorized based on the output $P_1$ from the timing circuit 22, is read out as a digital output. The DA converter 203 receives the analog output from the switching means 19 while it receives the digital output from the memory means 202. The AD converter 204 is adapted to convert the output from the DA converter 203 based on the output from the timing circuit 22. The output of the arithmetic circuit 20, i.e., the output of AD converter 204 comprises digital sine and cosine signals for use in determining the positional coordinates, and they are transmitted to the computer 25. The preferred embodiment of the vector component arithmetic circuit will be more fully described later in connection with FIG. 10.

The computer 25 comprises, as usual, an arithmetic unit, a control unit, and a memory unit. The constitution of each unit is well known, so no detailed explanation thereof will be given. The computer 25 receives, in addition to the output from the operation circuit 20, the output $P_3$ from timing circuit 22 as well as the output from a distance detecting device 26, and it calculates the positional coordinates in accordance with a program, as will be later described in detail, and then transmits its output to display means 27.

The distance detecting device 26 may comprise means for measuring the revolution number of the propeller shaft of the land vehicle and means for detecting whether the shaft is in normal revolution or in reverse. The output of this device will be transmitted to the computer 25 as information relating to the distance that the vehicle has travelled.

The display means 27 may be constituted with appropriate elements, for instance LEDs, and is adapted to display the values of the X and Y coordinates that the computer 25 has calculated.

The inclination of the magnetic field vector detecting device is, as mentioned, separately picked up by the inclination detecting device 17 in respect to all directions, back and forth as well as right and left, and then the component picked up separately is transmitted to another switching means 28, which in turn transmits its selected output to another switching means 29 in compliance with the output $P_4$ from the timing circuit 22. Then, the switching means 29 selects either the output from switching means 28 or that from AD converter 203 of the arithmetic circuit 20 according to the output $P_5$ from the timing circuit 22. The output selected is then transmitted to the DA converter 204.

The timing circuit 22 is adapted to transmit various timing pulses $P_1$ through $P_5$ as mentioned above, and also transmits the timing pulse $P_6$ to motor synchronizing circuit 30 in accordance with a reference phase pulse $P_0$ that is the output from the rotary position detector 14 for detecting the rotated position of the S-shaped magnetic piece.

The motor synchronizing circuit 30 is adapted to keep the angular velocity of the rotary axis 13a of the motor 13 constant and is constituted as a phase lock loop (PLL) circuit as shown in FIG. 9 in the present invention.

The computer 25 is constituted to perform as per the following: The computer memorizes coordinates corresponding to an arbitrary number of objective points at which turning to the right or the left is to be made, and also memorizes orders for making such turning. Then, the computer selects one objective point. When the turning is made at a selected point as ordered, the computer automatically changes the point initially selected into another point to be next. When the turning is made at a set arbitrary point as ordered, the initial coordinates for the set point are replaced by ones newly determined. Further, the computer 25 is constituted to indicate, at display 27, information such as three dimensional coordinates (X, Y, Z) advancing direction, direction to the objective point, straight distance to the objective point, number or symbol of the objective point, order for turning to the right and left, alarm and so forth.

To put it in concrete terms, such computer may be represented by a model 6800, 8 bit, 1 mHz clocked micro computer of the type manufactured by Motorola.

In the following paragraphs, operation of the respective parts in the apparatus according to the invention will be explained in detail.

Magnetic Field Vector Detecting Device

Figure 2:
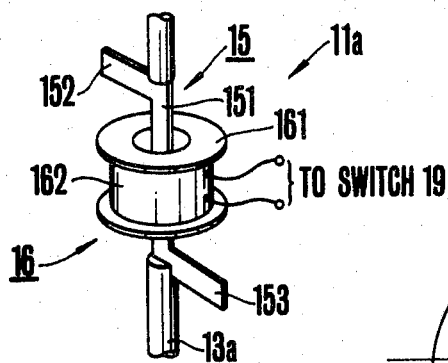
FIG. 2 is a perspective view of an example of the magnetic field vector detecting device.

The devices 11a, 11b and 11c, as previously mentioned, all have the same construction, so that explanation will be made by referring only to the device 11a. FIG. 2 schematically shows the construction of the magnetic field vector detecting device 11a which includes the rotary magnetic piece 15 connected to the rotary axis 13a of the motor 13. The rotary magnetic piece 15 is formed in an "S" shape by stacking thin plates made of magnetic material, such as permalloy, and it has a principal stem 151 which is connected in series with the rotary axis 13a and branches 152 and 153 which extend from both ends of the principal stem 151 in directions perpendicular to the stem but in directions opposite to each other. The detecting device 11a also has a fixed ring coil 16 which is formed with a bobbin 161 having flanges at both ends and a conducting wire coiled on its bobbin as well. With this construction, the magnetic flux Φ of the rotary magnetic piece 15 becomes proportional to the magnetic field vector H around the magnetic piece 15, and takes the value corresponding to the relative relation between the mechanical direction of the magnetic piece and the direction of the magnetic field vector H. That is, the flux I of the rotary magnetic piece is expressed by the following equation:

$$I = K_1 Hxy \cos\theta + K_2 Hz$$

where, $K_1$ and $K_2$ are constants depending on the material and shape of the magnetic piece 15, Hz is the component of the magnetic field vector H in the direction of the rotary axis, Hxy is the component of the magnetic field vector in the plane perpendicular to the rotary axis, and $\theta$ is the angle that the direction of the rotary magnetic piece 15 makes to the Hxy component.

When the rotary axis 13a and the rotary magnetic piece 15 are rotated at a constant angular velocity $\omega$, the angle $\theta$ becomes $\omega + \psi$. Thus, in the rotary magnetic piece 15, a magnetic flux change is caused that may be expressed as $dI/dt = K_3 Hxy \sin(\omega\tau + \psi)$, where $\psi$ denotes the angle that is made between the direction of the magnetic piece and the component Hxy at t=0, and $K_3$ is a constant.

Consequently, it is possible to obtain through the fixed coil 16 a sinusoidal output voltage, the amplitude of which is proportional to the Hxy component and the phase of which is shifted from the direction of the magnetic field vector detecting device 11a by an angle y; thus, the X and Y components of the magnetic field may be obtained therefrom.

In a magnetic field vector detecting device having the structure mentioned above, a voltage generated by the fixed coil 61 is proportional to the density change in the magnetic flux penetrating through the coil. Now, considering such magnetic flux by dividing it into two parts, the magnetic flux Φa passing through the rotary magnetic piece 15 and the magnetic flux Φb penetrating through the fixed coil 16, it will be seen that the magnetic flux Φa always penetrates through all the windings regardless of the position of the fixed coil 16. On the contrary, the magnetic flux Φb takes different values depending on the positional relation between the fixed coil 16 and the magnetic piece 15. For this reason, if the rotary axis of the magnetic piece 15 is not in line with the center of the coil, and if the direction is changed within the rotary plane of the detecting device, the output from the detecting device will vary depending on the direction.

Figure 3:
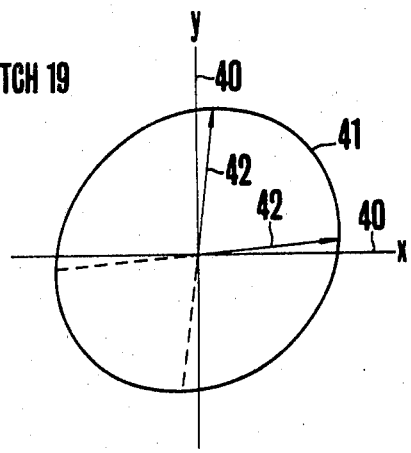
FIG. 3 is a diagram for use in explaining error detection and showing the relationship between the direction of the magnetic field vector detecting device and its output amplitude as well as its phase angle.

FIG. 3 is a diagram for use in explaining a detection error, and shows the relation among the direction of the detecting device, the amplitude of the detecting device output and the phase angle obtained in such a case as mentioned. In the figure, the reference numeral 40 denotes X and Y axes which are taken in the rotary plane of the magnetic piece, 41 denotes the output amplitude of the detector in correspondence with its direction, and 42 denotes vectors of the detector output when the detector directions are 0° and 90° respectively.

As will be apparent from FIG. 3, such a magnetic field vector detecting device as shown in FIG. 2 has the defect that the rotary axis of the magnetic piece has to be accurately in line with the center of the coil. This will be more fully explained in conjunction with FIG. 4 which shows equi-magnetic potential distribution lines.

FIGS. 4(a) and 4(b) are diagrams copied from the patterns displayed on a cathode ray tube, and represent equi-magnetic potential distribution lines made through a computer simulation process with the condition that uniform magnetic fields are applied to the rotary magnetic piece in the direction of its rotary axis as well as in the direction perpendicular thereto. In the figure, parts corresponding to those shown in FIG. 2 bear the same reference numerals. Reference numerals 45 and 45' denote equi-magnetic potential lines, while 46 and 46' represent some of the lines of magnetic force which perpendicularly intersect the equi-magnetic potential lines. The change in magnetic force lines penetrating through the coil results in the generation of a voltage. In this case, what contributes to the voltage generation is each component of the magnetic force lines, such as 46 and 46' in the direction of the coil axis, and the magnitude of such voltage is inversely proportional to the inclination of the magnetic potential relative to the coil axis. Reference numerals 47 and 47' denote lines parallel to the coil axis. Intersecting points between the lines 47, 47' and the equi-magnetic potential lines are denoted by reference numerals 48, 49, 48' and 49'. From these points, the magnetic field intensity can be quantitatively determined by measuring the distance between points 48 and 49, and points 48' and 49'.

Determining the magnetic field intensity by relying on the method mentioned above, it will be understood that in the case of FIG. 4(a) the intensity is increased when either the distance from the branches 152 and 153 of the magnetic piece 15 becomes larger, or the distance from the rotary axis 13a becomes larger, and that in the case of FIG. 4(b) the intensity along the branches also becomes larger when the distance from the rotary axis becomes larger.

In view of the above, when the coil is located within a certain limited central portion of the rotary axis where the magnetic field intensity is smaller, commonly in FIGS. 4(a) and 4(b), it becomes possible to decrease to a great extent the quantity of the magnetic flux penetrating through the coil at the place other than the magnetic flux path of the magnetic piece 15.

FIG. 4 shows schematically an example of the modified magnetic field vector detecting device 15 which is constructed in view of the foregoing discussion. The device is characterized by its fixed coil 16A.

In preparing and disposing the coil 16A around the stem of the magnetic piece 15, the following requirements must be satisfied. First, the area of the coil cross section taken to include its rotary axis has to be made maximum within the region that is defined, as shown in FIG. 4A, by the branches 152 and 153 of the rotary magnetic piece 15 and the two dotted paralleled lines A and B. Secondly, the coil has to be disposed around the stem 151 of the magnetic piece 15 in such a way that magnetic flux density of the magnetic piece 15 becomes maximum in respect to the magnetic field vector within a plane perpendicular to the rotary axis 13a. Satisfying the requirements above, the coil 16A is made to have a cross section, as shown in FIG. 4A, like two standing roofs opposing each other at both sides of the stem 151 of the rotary magnetic piece. The slopes of the roofs are determined by the two dotted parallel lines A and B so that each ridge 164 of the roofs comes to the same level.

Consequently, in the magnetic field vector detecting device as constructed in FIG. 4A, no coil exists where the magnetic flux density largely varies from place to place. As a result, the quantity of magnetic flux penetrating through the coil at places other than the magnetic piece is kept very small at almost all times.

Differential Arithmetic Circuit

FIG. 5 shows, with a reference numeral 18, an example of the differential arithmetic circuit by which the present invention is further characterized. The circuit 18 is adapted to correct the deviation in the phase and amplitude of the output from the detecting devices 11a, 11b and 11c. The deviation is mainly caused by nonuniform mechanical characteristics of the detecting devices. The circuit 18 is also adapted to obtain the output differences among the detecting devices 11a, 11b and 11c, which is used in eliminating the magnetic field caused by a magnetic body as described later.

In the figure, reference numerals 181, 182 and 183 denote amplifiers which have comparatively high amplification (for instance, 500 times) and receive the output from the detecting device 11a, 11b and 11c. These amplifiers are adapted to correct the deviation in the phase and amplitude of the output, which results from the mechanical characteristic differences among the detecting devices. The output of amplifier 183 is transmitted to an adder 184 while the output of amplifier 181 is inverted and then sent to the adder 184. The output of amplifier 182 is also inverted and then transmitted to another adder 185. The output of the amplifier 183 is also sent to an input terminal of the switching means 19 through an amplifier 186. The output from adder 184 is also transmitted to another input terminal of the switching means 19 through an amplifier 187 while that from the adder 185 is transmitted to another input terminal of the switching means through an amplifier 188. The differential signals obtained from the adders 184 and 185 are small in comparison with the main signal transmitted from the amplifier 181, so that amplifiers 186, 187 and 188 are given weighted amplification degrees respectively; for instance, 2 times, 10 times, and 20 times. This weighting is to decrease the conversion error in the A-D converting operation accomplished by the AD convertor 204 in the vector arithmetic circuit 20. Eventually, the error will be corrected by the software of the computer 25 when eliminating the magnetic field originating from a magnetic body.

Rotary Position Detector

FIG. 6 shows with reference numeral 14, an embodiment of the rotary position detector, which includes a circular plate 50 having a slit 50a, a light emitting element 51, and a light receiving element 52. The circular plate 50 is connected in series with the rotary axis 13a of the motor 13, and the slit 50a is formed in the radial direction of plate 50. The light emitting and receiving elements 51 and 52 are disposed at both sides of the circular plate 50 so as to oppose each other. These elements may be LEDs, for instance. One end of light receiver 52 is grounded while its output is transmitted to an operational amplifier, i.e., the level slicer 54, as well as to an amplifier 55. The output from amplifier 55 is peak value detected by means of a peak detection circuit 58 which includes a diode 56 and a condenser 57. The output voltage of the peak detection circuit is divided by resistors 60 and 61, and then input to the plus side input of slicer 54 as a reference voltage $e_s$.

Since the reference voltage $e_s$ is determined by the output of the peak detection circuit, the slice level is increased when the peak value of the light receiver output is increased; it is decreased when the peak value is decreased. The slice level of the light receiver output which is obtained from the revolution of the rotary magnetic piece 15 is increased or decreased depending on the increase or decrease of the peak value of the light receiver output. Accordingly, when the level slice is performed with reference to the voltage $e_s$, the time of starting and stopping the slicing is kept constant regardless of slope angle change in the light receiver output. Thus, it is possible to transmit from the output terminal 62 pulse signals, the timing of which is stabilized at its front and rear end.

One end of light emitter 51 is connected with a power source +V while the other end is connected with the output terminal of a differential amplifier 65 through a current limiter (a resistor 64). This differential amplifier 65 is an operational amplifier, of which the minus input terminal receives the output of the peak detector circuit through an input resistor 66 while the plus input terminal is given a control voltage $E_c$. Between the output terminal and the minus input terminal of amplifier 65 there is connected a negative feedback register 67. The input terminal of amplifier 55 is connected with the +V source through a register 68 to receive a predetermined biasing voltage.

With the above-mentioned circuit formation, there is provided a feedback loop to the light emitter 51, which comprises the light receiver 52, amplifier 55, peak value detection circuit 58, operational amplifier 65, and resistor 64. Consequently, when the output voltage of the peak value detector becomes larger than the control voltage $E_c$, the output level of the differential amplifier 65 is lowered; it is pushed up when the output of the peak value detector becomes smaller than $E_c$. In other words, the current of the light emitter 51 is determined by referring to the control voltage $E_c$ so that the current of the light emitter 51 is stabilized regardless of fluctuation in the power voltage, ambient temperature and other factors.

With the construction mentioned above, light emitted by the light emitter 51 is stabilized, the peak value of the output from the light receiver 52 is kept constant, the output from the angular position detector is stabilized by setting the reference voltage $e_s$, and it is possible to obtain from the output terminal 62 pulse signals produced with precise and constant slice timing.

FIG. 7 is a graph showing the characteristic of the magnetic piece rotating angle versus the relative output. A curve "a+ represents the output characteristic when all the parts of the detector are normally operated. $L_a$ denotes the slice level in that condition. When the output of the light receiver 52 is lowered by some cause, for instance, the temperature of the light receiver, its life limit, power voltage fluctuations, or the like, the slice level is lowered by deviation of the peak value from the reference value. Thus, the output obtained is able to have the same front and rear edges as the output in the normal condition (line a). When the slice level cannot be removed up and down, the output, i.e., the edge of the reference phase pulse, is removed from the point $\theta_a$ to the point $\theta_b$, this change causing an error in the directional measurement.

It should be noted that the angular position detector as mentioned above is not limited within what is described and that it can be modified in various ways. For example, the resistors 60 and 61 for use in the voltage divider may be replaced by variable condensers.

Inclination Detecting Device

The inclination detecting device 17 comprises two detecting units which are adapted to detect the inclination in all directions, back and forth as well as right and left. FIG. 8 shows the constitution of the device embodying the present invention.

As illustrated, a reference numeral 70 indicates a magnet, 71 a yoke, 72 an arm which is only movable in the direction of the coil axis, 73 a supporting point using a pivot or a spring, 75 a displacement detecting element, 76 a feedback type amplifying system, 78 a force coil, 79 an output terminal, and 80 a resistor. The magnet 70 and force coil 78 are fabricated in such a way that the relative position between them is changed when inclination of the device happens. Further, the device is designed to flow an electric current into the coil 78 when the device is inclined. In this case, the current in the coil flows in the direction required to get back the positional relation between the magnet and coil before occurrence of the inclination.

According to the inclination detecting device as constructed above, when the inclination occurs, it is first detected by the displacement detecting device 75. What is detected is transmitted as a displacement signal to the feedback type amplifier 76 and receives amplification there. Then the current into the force coil 78 flows in the direction to return the displacement before the inclination happens. In this way, from the output terminal 79 an analog output is obtained which is proportional to the sine of the displacement angle. Accordingly, it becomes possible to obtain vector components of the inclination by arranging two detecting units such that they meet at right angles to each other.

Synchronizing Circuit

FIG. 9 shows a synchronizing circuit 30 in accordance with the present invention. This circuit is adapted to have the motor 13 synchronizingly operated in accordance with the timing circuit 22.

In the figure, a reference numeral 91 denotes a commercial pulse motor, 92 denotes an input terminal to which the signal for driving the motor is applied, and 93 denotes a coil for use in detecting the revolution number of the motor. The motor 13 shown in FIG. 13 is composed of the constituents mentioned above.

The synchronizing circuit 30 has a phase detector 95 which compares the output from the detecting coil 93 with the input signal P supplied from terminal 94 and having a reference frequency, and then transmits the output having a pulse width corresponding to the phase difference obtained from the comparison. Further, the synchronizing circuit 30 has a first operational amplifier 97 connected to the plus terminal of the coil 93, a diode 98 for use in rectifying the output of operational amplifier 97, a condenser 99 connected between the cathode of the diode 98 and ground, and a connecting means 100 for connecting the cathode with the minus input terminal of amplifier 97. With constituents as mentioned above there is provided a circuit 101 for detecting a peak value or a mean value. In other words, the circuit 101 has the functional capability of detecting a signal having an amplitude corresponding to the revolution number of the motor 13.

Still further, the synchronizing circuit 30 had a second operational amplifier 104 of which the minus input terminal is connected with the cathode of diode 98 through the input resistor 103, and also has a negative feedback resistor 105 connected between the output of the second operational amplifier 104 and the minus input terminal thereof. The plus input terminal 107 of operational amplifier 104 receives a reference voltage $e_{RS}$ which is adapted to set a pull-in center frequency.

By the circuit formation mentioned above, there is provided an amplitude control circuit 108 which compares the output from the peak or mean value detecting circuit 101 with the reference voltage $e_{RS}$ applied to the plus terminal of the amplifier and varies its output in correspondence with the result of the comparison. Still further, the synchronizing circuit 30 includes transistors 111 and 112. The transistor 111 is an NPN transistor, of which the collector receives the output of amplifier 104 through the resistor 110, the emitter receives the output of phase detector 95, and the base is grounded. Accordingly, it constitutes a multiplier 111 making a product of pulse width by amplitude. The other transistor 112 is also an NPN transistor of which the base receives the collector output of transistor 111, the collector receives the plus voltage and the emitter transmits the output to the input terminal 92 of motor 13. Transistor 112 thus constitutes an amplifier for use in driving the motor 13.

The operation of the synchronizing circuit 30 as shown in FIG. 9 will be explained in the following.

As the amplitude of the output developed by coil 93 is proportional to the revolution number (rotational speed) of the motor, the output from the peak or mean value detecting circuit 101 is also proportional to the revolution number of the motor 13. The second amplifier 104 compares the output from the peak or mean value detecting circuit with the reference voltage $e_{RS}$ supplied from the input terminal 107. The output of this second amplifier 104 is then varied in response to the comparison result. More specifically, when the revolution number of motor 13 is under the standard, a control is performed so as to make the output voltage from the second amplifier 104 higher, while another control is given to lower the output voltage when the motor revolution number is over the standard. When a pulse input is applied to the multiplier 111 from the phase detector 95, a pulse signal is obtained, the amplitude of which is the same as that of the output voltage of the second operational amplifier 104 and the pulse width of which is the same as that of the input pulse. The pulse signal is then applied to the input terminal 92 for driving the motor through amplifier 111.

The construction and operation of the phase detector 95 is known well so that explanation thereabout will be refrained.

The output from the coil 93 proportionally varies corresponding to the revolution number of the motor 91 so that the output from the amplitude control circuit 108 is also varied in correspondence with the motor revolution number. The phase detector 95 transmits a signal that varies its pulse width in compliance with the difference from the reference input signal $P_6$. As a result, the multiplier 111 makes a product by two outputs, one of which is the amplitude control circuit 108 and the other is from the phase detector 95, and it transmits to the input terminal 92 of the motor 13 through the amplifier 112 a pulse signal that has a pulse width in correspondence with the motor revolution number. According to the circuit described above, there is provided at the output side of the phase detector 95 neither an integral circuit with a large time constant nor a phase compensation circuit which also has a large time constant. Thus, a quick response characteristic is obtainable; namely, the response of the peak or mean value detector is faster than the time constant of the motor, and the response is transmitted to the motor through the amplitude control circuit 108. Thus, it is possible to provide a simply constructed synchronizing circuit which needs no complicated auxiliary means, such as the phase compensating circuits often used in the prior art, and which shows a quick synchronizing operation against external disturbance.

Vector Component Arithmetic Circuit and Timing Circuit

FIG. 10 shows each substantive portion of the vector component arithmetic circuit 20 and the timing circuit 20 according to the present invention, and it is prepared in detail more than that shown in FIG. 1.

As shown in FIG. 10, the arithmetic circuit 20 includes an input terminal 201a which receives the output of the magnetic field vector detector through the switch 19, and another input terminal 201b which receives a reference phase pulse $P_1$ from the timing circuit 22. The analog signal received at the input terminal 201a is transmitted to DA converter 203 and is used to obtain an analog output proportional to the product of itself and the digital output of the memory means 202. Accordingly, where the voltage-current conversion resistance of the converter 203 is $R_o$, the current-voltage conversion resistance is $R_1$, the analog input signal is e, and the digital input signals are $A_1, A_2, A_3, \ldots A_8$, the output signal of the converter $V_o$ is given by the following equation:

$$V_o = e(A_0/2 + A_2/4 + A_3/8 + \ldots A_8/256 R_1/R_o$$

A signal controlling the memory means 202 is provided by the output from the preset counter 221 of the timing circuit 22. In other words, it is such a straight signal that the digital value corresponding to the address selection is read out at the output side (i.e., the side of the DA converter). The preset counter 221 is counted up with clock input pulses from a preset information setting circuit 222 as well as from a frequency divider 224. The preset counter 221 transmits its output of which polarity is inverted at every one-round of it, i.e., integral gate signal. The preset information setting circuit 222 controls preset values in compliance with a preset information changing signal $S_1$ which is inverted at every two rounds, and presets the counter 221 at the time of the reference phase pulse from the input terminal 225.

The frequency divider 224 transmits various timing signals $P_3$ through $P_8$ by receiving the output of a master clock pulse generation circuit 226, which is, for instance, a pulse generator of 100 kHz and of which the output is also transmitted as the clock output $P_2$ to the AD converter 204, which is a dual integration type converter and performs analog-digital conversion by integrating the analog output of the DA converter 203 or the inclination detecting device 17 over the period that is equal to the integral multiple of the period of the basic sine wave; namely, the AD converter receives the output of a switch 29 which is transmitted to a switch 207 through the input terminal 206. Switch 207 is controlled by the integral gate signal $P_2$ from the preset counter 221. When the signal $P_2$ is "0", an analog signal input terminal 206 is selected, and when it is "1", a reference voltage input terminal 208 is selected. The output of switch 207 is transmitted to an integrator 212 comprising a resistor 209, a condenser 210 and an amplifier 211. The output of integrator 212 is transmitted to a comparator 213 and is compared with a zero potential. The output of comparator 213 is further transmitted to AND gate 214 which performs an AND operation with respect to the integral signal $P_2$ of the timing circuit 22 and the output of the master clock generating circuit 226, i.e., the clock signal $P_2'$. The output of AND gate 214 is transmitted to the counter 215 for use in AD conversion. Counter 215 receives the signal $P_2$ from the timing circuit 22 as a reset pulse and is reset when the signal $P_2$ from the preset counter 221 is inverted from "1" to "0". The output of counter 215 is transmitted in parallel to the computer 25.

FIG. 11 shows various wave forms which are used for explaining operation of the circuits as shown in FIG. 10. In the figure, the respective waveforms (a) through (h) are as follows: (a) corresponds to the signal that is to be measured and applied to the input terminal 201 of the vector arithmetic circuit 20; (b) corresponds to the digital signal that is transmitted from memory means 204 to DA converter 203; (c) corresponds to the reference phase pulse applied to the input terminal 225 of the timing circuit 22; (d) corresponds to the analog signal applied from DA converter 203 to AD converter 204; (e) corresponds to the integral gate signal $P_2$ from the preset counter 221; (f) corresponds to the output signal from the integrator 212; (g) corresponds to the output signal of the comparator 213; and (h) corresponds to the output signal of AND gate 214.

The operation of the circuits as shown in FIG. 10 will now be described by referring to the waveforms as shown in FIG. 11. As the waveform of a reference signal, there is adopted a sine wave having the frequency f. One period (2 radians) of the reference signal is divided into $2^A$ and then the crest value corresponding to each angle is stored as a D-bit digital signal in the memory 202. In this way, numbers corresponding to one period are stored in the memory 202. In other words, the memory 202 is a D-bit memory device wherein the address selection information is received from the preset counter 221 by the number of A, the signals having the waveform as shown in FIG. 11 are stored as digital values.

The output of the master clock generating circuit 226 is divided by the divider 224 to obtain pulse signals with the frequency $2^A \times f$. When the signals are input to the preset counter 221 as 8-phase counting-up clock inputs, binary digits are provided by the number of input pulses. The binary digits are received by memory 202 as address selection information and then, from the output of the memory there are read out D-bit digital values which represent the crest values of the reference sine wave corresponding to each angle that results from the $2^A$ division. DA converter 203 provides signals having the waveform (d) as shown in FIG. 11, which are proportional to the product of the digital signal having the reference sine wave (b), which is read out of the memory 202, and the analog input signal having the waveform (a) that is to be an object of the measurement. This signal with the waveform (d) is then introduced into AD converter 204 in the next stage. AD converter 204, which is of the double integral type, receives the signal having the waveform (d) from DA converter 203 through the switch 207, which is controlled by the integral gate signal P$_2$ having the waveform (e), and performs integration with the integrator 212 to produce the output signal having the waveform (f). The output of said integrator 212 is introduced into the comparator 213 and compared with the reference voltage. The output of the comparator has the waveform (g) as shown in FIG. 11. This output signal is then sent to AND gate 214. AND gate 214 performs an AND operation on the output from the comparator 213, the integral gate signal P$_2$ from the preset counter 221, and the clock input signal P$_2$ from the master clock generating circuit 226. From the output of the AND gate, there is obtained a signal with the waveform (h) which is transmitted to the counter 215 to be counted. In this manner, it becomes possible to obtain a direct reading of the preset phase component vector for the input signal out of the output terminal of AD converter 204. Further, it is possible to read out both the sine component and the cosine component alternatingly by means of changing the phase of the preset value in the preset information setting circuit from sine to cosine, or vice versa, by using the preset information changing signal S$_1$.

In the foregoing, for simplifying the explanation, it has been assumed that the DA converter is able to produce the product of the input signal and the reference sine wave regardless of their sign (plus or minus). In general, however, an ordinary DA converter can produce a product only when the input signals are both positive. Accordingly, when actually implimenting the embodiment above, it should be noted that the input terminal 201 receiving a signal to be measured, as well as the input terminal 206 of the AD converter receiving the analog input signal, must be provided with polarity inverting circuits and a switch so as to cause both input signals to always be positive. At the same time, AD converter 204 should be of the type operable for both plus and minus polarities.

Further, in the foregoing explanation, digital values of the reference sine wave stored in the memory 202 should be those for a full period, but the digital values for a half or a quarter period may also be usable.

As apparently seen from the explanation above, according to the circuits as shown in FIG. 10, error due to the selection filter, which has been often observed thus far, is never introduced and no arithmetic process for coordinated conversion is needed, and vector components and AD conversion are obtained at the same time.

In the following paragraphs there will be explained some remarkable functions of the present positional coordinates determining apparatus which further characterize the present invention.

Function of Eliminating the Influence of Magnetic Field Due to a Magnetic Body

FIG. 12 is a three dimensional diagrammatical representation used to explain the positional relationship among three magnetic field vector detecting devices and a magnetic body. In the figure, a, b and c represent positions of said three detecting devices (corresponding to 11a, 11b and 11c in FIG. 1), which are aligned along Z-axis, and it is assumed that a magnetic body exists near the X-Y plane. The magnetic body is considered as a set of several magnetic poles which are distributed in a complicated fashion. In the following discussion, therefore, the magnetic body is approximated by an equivalent magnetic dipole, of which X-components (in the X-Z plane) are +mx and −mx, while Y-components (in the Y-Z plane) are +my and −my, where each component represents a set of magnetic poles and the magnetic field intensity caused at points a, b and c in one direction by one of said magnetic poles is entirely the same as that which is caused by another magnetic pole at the same points in the same direction. According to the approximation above, the X and Y components are calculated separately in the same way so that the discussion hereinafter will be made only in terms of the X-component.

Now, as shown in FIG. 12, when the equivalent magnetic dipole is aligned on the X-axis such that its X-components +mx become symmetric with respect to the origin O. $l_x$, $n_{1x}l_x$ and $n_{2x}l_x$ represent the distance from points a, b and c to each equivalent magnetic pole respectively; h denotes the distance from the origin to the point a, and d indicates the distance from the origin to each equivalent magnetic pole. The X-components $e_{ax}$, $e_{bx}$ and $e_{cx}$ of the magnetic field intensity caused by the equivalent magnetic pole are given by the following expressions:

$$e_{ax} = 2m \times d / l_x^3 \tag{1}$$

$$e_{bx} = 2m \times d / n_{1x}^3 \cdot l_x^3 \tag{2}$$

$$e_{cx} = 2m \times d / n_{2x}^3 \cdot l_x \tag{3}$$

$$e_x = \sqrt{x^2 + h^2}, \; n_{1x} \cdot l_x = \sqrt{x^2 + (h+D_1)^2},$$
$$n_{2x} \cdot l_x = \sqrt{x^2 + (h+D_2)}$$

where $D_1$ and $D_2$ are respectively the distances from the point a to the points b and c.

When $H_x$ is the X-component of the objective magnetic field intensity, $e_{ax}+H_x$, $e_{bx}+H_x$, and $e_{cx}+H_x$ are measured at measuring points a, b and c. Accordingly, the output difference $\Delta ab$ between detectors a and b, and also the output difference $\Delta ac$ between detectors a and c are given by the following equations.

$$\Delta ab = e_{ax} - e_{bx} = e_{ax}(1 - n_{1x}^{-3}) \quad (4)$$

$$\Delta ac = e_{ac} - e_{cx} = e_{ax}(1 - n_{2x}^{-3}) \quad (5)$$

The ratio of the above thus becomes:

$$\Delta ac/\Delta ab = (1 - n_{2x}^{-3})/(1 - n_{1x}^{-3}) \quad (6)$$

$n_{1x}$ and $n_{2x}$ in the right side of the equation (6) are generally functions of d, h, $D_1$ and $D_2$. For simpler explanation, assuming that $D_1$ and $D_2$ are adequately smaller than h, the following equation (1) is obtained.

$$D_2/D_2 \approx (n_{2x} - 1)/(n_{1x} - 1) \quad (7)$$

From equations (6) and (7) it is possible to determine $n_{1x}$ and $n_{2x}$.

When the X-component of the output from the detector a is $E_{ax} = e_{ax} + H_x$, the X-component $H_x$ of the magnetic field to be measured is obtained from the equation (5) above, for instance, as follows.

$$H_x = E_{ax} - e_{ax} = E_{ax} - \Delta ac/(1 - n_{2x}^{-3}) \quad (8)$$

Accordingly, as shown in FIGS. 1 and 5, when $e_a$, $\Delta ab$, and $\Delta ac$ are obtained, the computer 25 becomes ready to calculate the X-component $H_x$ of the magnetic field to be measured.

As to determination of the Y-component of the magnetic field to be measured, the same method discussed above is applicable. Accordingly, the X and Y components in the plane perpendicular to the Z-axis are determined without any influence from the magnetic body. In other words, according to the apparatus of the present invention, the magnetic field caused by the magnetic body can be eliminated by using the output difference between a plurality of magnetic field vector detecting devices as well as the ratio therebetween.

In this case, at places other than those near the equator, the vertical component fluctuates with respect to the geomagnetic vector so that the rotary axis 13a is always required to be kept vertical in order that the X and Y components are directly measured as bearings of the geomagnetic poles. A moving object such as a land vehicle usually experience pitching and rolling motion during its running. Consequently, it is not possible to satisfy the above condition using a magnetic vector detecting device fixed on the moving object.

Correction of Error Due to Inclination of Magnetic Vector Detecting Device

FIG. 13 is a diagram showing the revolution of coordinates which are used for obtaining the change of the measured value that is caused by inclination of the magnetic field vector detecting device. In the figure, X, Y and Z represent three components of the geomagnetic field vector, and the X-axis represents the direction along which the moving object runs in the X-Y horizontal detecting plane. Accordingly, $\sqrt{X^2 + Y^2}$ represents the horizontal component of the geomagnetic force while Z represents its vertical component.

Now, considering the two dimensional components X' and Y' of the terrestrial magnetism which are obtained by rotating the coordinate system shown in FIG. 13 by angles $\alpha$ and $\beta$ in the directions of back and forth as well as of right and left, X' and Y' are expressed as follows:

$$X' = X \cos \alpha + Z \sin \alpha \cos \beta$$

$$X' = Y \cos \beta + Z \cos \alpha \sin \beta$$

Accordingly, for inclination angles $\alpha$ and $\beta$ of the magnetic field vector detecting device being measured, the horizontal component of the geomagnetic vectors X and Y are obtainable regardless of the inclination of said detecting device.

In the apparatus as shown in FIG. 1, therefore, the error introduced in the detected bearings are corrected by solving the simultaneous equations (9) in the computer 25.

As discussed above, according to the present invention, it is possible to always indicate the positional coordinates of the moving object using apparatus having small and simple mechanisms and circuit constitution. Further, with the function of the computer being fully utilized, the following will be also obtainable:

(1) Setting of an Objective Place.

The objective place (destination) being known from a map or the like, the coordinates corresponding thereto are memorized.

(2) Setting a Running Route.

A plurality of existing objective places and characterized points along the designated route, the numbers assigned to such points and coordinates corresponding thereto are memorized.

(3) Setting of the Turning Point.

The numbers assigned to the points a indicate which turns are to be made, and their corresponding coordinates are memorized.

(4) Calculation of the Error.

The error to be introduced at a particular running point is corrected in response to the running distance from the reference point which includes no error (running distance error setting value).

(5) Calculation of the Distance to an Objective Place.

The linear distance from the running point to the object is next calculated.

(6) Calculation of the Angular Deviation.

There is calculated the angular deviation between the running direction and the direction to the objective place.

(7) Determination of the Present Running Point.

From the comparison of the value obtained in item (4) above or a distance limit value as set separately and the resultant of the calculation (5), it is determined whether or not the present running point is within a preset range.

(8) Calculation of Running Distance, Speed, and Direction.

(9) Determination of Turning.

There is calculated a time differential value with respect to the running distance (this value may be used for calculating the acceleration in the right and left directions). Then, the absolute value of the differential value is compared with an angular limit as previously set, thereby judging completion of the turn. The direction of turning, to the right or left, is determined from the sign of the differential value. Further, from comparison with information of the item (3), it is determined whether or not the turn was made as requested.

(10) Automatic Replacement of Number Assigned to the Point.

In case the running is made along the route as set, memorized information as to numbers assigned to points, turning points and coordinates, is selected according to the planned running course, and the information once used has to be renewed at the time of every passing of the objective places. In this case, the automatic replacement of the number assigned to the point is possible when such a point is limited to a turning point along the route, and at the same time the condition for determination in items (7) and (9) are satisfied.

(11) Correction of Coordinates.

In case of performing the automatic replacement mentioned in item (10) above, the coordinates having been set thus far are replaced by the coordinates presently measured. By this operation, the error occurring up to the point measured is obivated, so that accumulated error is reduced even in long distance running.

(12) Display.

The following information may be displayed through suitable display means: the coordinates (X, Y, Z), the number assigned to the objective point, turning point information, and the resultant calculation according to items (5), (6) and (8). Display may be made jointly or separately by means of LED or liquid crystal display means. It is also possible to display the running coordinates and moving direction on a map drawn on a cathode ray tube. Further, it is also possible to plot the position of the moving object on a map by using a X-Y plotter.

(13) Alarm.

Alarm is made when the running opsition is out of a set range, or other alarm requirements are met.

(14) Memory.

Various information, for instance, path traces of the moving object, may be easily memorized by means of either internal or external memory means so that it is possible to know both the position and direction of the moving object correctly and dynamically. It is also possible to guide the moving object to an unknown objective place with safety and accuracy. Further, it is possible to transmit the positional information to a central station so that centralized control of business may be realized at places which require it; for instance, at a police station, a hospital or ambulance depot, a fire station, a transportation station, and so forth. Further, it should be noted that the position determination made by the apparatus of this invention could relate to paths over either land or water, or both. The present invention thus has a very wide range of applications.

In order to conform the accuracy of apparatus according to the present invention, an experiment was performed in which the coordinates measured over a 17 Km course were accurately plotted on a map by means of an X-Y plotter. The experiment confirmed all hypotheses.

In the following paragraphs, the manner in which the computer 25 performs the above-mentioned functions will be described.

FIGS. 14A, 14B and 14C are flow charts showing an outline of the computer program for calculating the positional coordinates of the moving object.

After completion of the initial setting, the computer 25 sums up in its memory, or register, the magnetic field vectors $e_{ax}$, $e_{ay}$, $\Delta ab_x$, $\Delta ab_y$, $\Delta ac_x$, and $\Delta ac_y$ which are obtained through the magnetic field vector detecting device, and the vector components G and T in the pitching and rolling directions of the vehicle, which are obtained from the inclination detecting device 17 (step 301). The magnetization quantity of the moving object is calculated in step 302 using the vector information indicated above. Then, through the step 303 correction is made with respect to the magnetization quantity and inclination. Further angular deviation is corrected through the step 304.

In the step 305, the running distance in a small section is calculated by using the output of the distance detecting device (26 in FIG. 1). Further, in the step 306, the height component in the small section is calculated by using the components of inclination. The, the X and Y components of the moving distance are calculated in step 308. The positional coordinates are calculated in step 309. The, the progressing direction and the linear distance to the objective place are calculated through steps 309 and 310 respectively. The information concerning the objective place is stored in advance in the memory of the computer. Further, the angle to the object is calculated by the step 312. The height component from the initial point is obtained through the step 313. The total of moving distance is calculated in the step 314. The saving of the moving distance in the small section is performed through the step 315 to make the correction of inclination as against the speed of the moving object.

After completion of the steps above, the computer 25 transmits its output to the display (27 in FIG. 1) to indicate information, for instance, the distance and angle to the objective place and the positional coordinates at present. Then, it is decided in the step 318 at what degree the direction is changed with respect to the prior one and also whether or not it is within the predetermined allowable range. When such directional change is made as demanded, the program further proceeds to the step 320 through the step 319. When turning is made within the predetermined range about the point that is memorized in advance in the memory of the computer as a point where turning is to be made, the program further proceeds to the step 321, in which it renews the number assigned to the point and the corresponding coordinates, and also replaces the set value with the newly measured coordinates. Then, the program returns to the portion ① of FIG. 14A and the same steps are repeated.

FIG. 15 shows a modified embodiment of the magnetic field vector detecting device 11 using a detector of the type in which a magnetic core is excited with alternating current, and the output of harmonics is detected, thereby measuring the magnetic field vector in the direction of magnetic path length. In the figure, reference numerals 130a and 130b denote detecting coils while 132a and 132b represent exciting coils. These coils are corresponding to fixed coils in FIG. 1. A combination of the exciting coil 132a and the detecting coil 130a, and the other of the exciting coil 132b and the detecting coil 130b respectively constitute transformers which are disposed to meet at right angles, thereby making the X and Y components of the terrestial magnetism directly and separately obtainable. To each of exciting coils an alternating signal is applied. In this case, the X and Y components of the output are separately obtained so that there is no need to change the reference sine wave into sine or cosine, and the same effect as heretofore explained is obtained by keeping it in the same place as the input and letting its frequency be twice the exciting frequency. In the embodiment above, the output from the detecting coils 130a and 130b are connected to the switch 19 such that the output difference among magnetic field vector detecting devices is obtained by calculation after digital conversion. However, it will be possible to make the difference in the state of analog signals and thereafter transmit it to the switch 19.

From the foregoing explanation, it will be fully understood how the X and Y components of the horizontal geomagnetic component force are obtained by apparatus according to the invention. However, the horizontal and vertical geomagnetic component forces are different from place to place so that upon making the present invention work requires that they be corrected. Such correction can be made, as explained in the foregoing paragraphs, by means of a comparatively simple arithmetic operation.

When normalized, the X and Y components (where $Y/X = $ constant and $X^2 + Y^2 = 1$) of the vectors in the direction of the moving object progression are calculated through the above-mentioned procedure, the coordinates of the moving object are attained by multiplying each component by the running distance for a short time obtained through the revolution detecting device. In the same way, the height of the moving object can be obtained by using the inclination value in the back and forth direction. Further, the deviation of the inclination detecting device in the direction of gravity acceleration, which is caused by acceleration, deceleration or turning of the moving object, may be corrected by calculating the change of distance pulse number with respect to the time (acceleration in the back and forth direction) and also calculating the product of the speed and the directional change in progression with respect to the time (acceleration in the right and left directions).

Although the present invention has been described above in terms of presently preferred embodiments, it is to be understood that such disclosure is by ways of example only and is not intended to be considered as limiting. Accordingly, it is intended that the appended claims are to be interpreted as covering all alterations and modifications as fall within the true spirit and scope of the invention.

What is claimed is:

1. Apparatus for determining the positional coordinates of a moving object comprising:
a plurality of magnetic field vector detecting devices each having a rotary magnetic piece and a fixed coil, said detecting devices being disposed in spaced apart fixed relationships to each other;
an inclination detecting device for detecting the inclination of said magnetic field vector detecting devices relative to a vertical direction;
a distance detecting device for detecting the distance that the moving object has travelled during a particular period of time; and
arithmetic means which receives output from said magnetic field vector detecting devices as well as from said inclination detecting device, calculates the horizontal component force vector of the geomagnetic field by using said output from said magnetic field vector detecting devices and from said inclination detecting device, further calculates the vector in the progress direction of the moving object referring to said horizontal component force vector, and integrates the product of said vector in the progress direction and the output from said distance detecting device, whereby the positional coordinates are obtained as the output of said arithmetic means, and coordinates which have initially been set at an arbitrary point are replaced by the newly determined coordinates when turning to the right or left is carried out at said arbitrary point correctly as ordered.

2. Apparatus according to claim 1, wherein each said coil of said magnetic field vector detecting device is disposed around the rotary axis of its corresponding rotary magnetic piece such that the magnetic flux density in the magnetic piece becomes maximum with respect to the magnetic field vector within a plane perpendicular to said rotary axis, and said coil is provided with such a cross section that becomes maximum within the maximum cross section of said magnetic piece but its contour does not extend out of said maximum magnetic piece cross section.

3. Apparatus according to claim 1, wherein the rotary magnetic piece of each magnetic field vector detecting device is alinged along the rotary axis of a motor which is synchronizingly rotated by means of a synchronizing circuit comprising signal extracting means for extracting a signal having pulse widths corresponding to the difference between the reference input signal and the rotary phase of the motor, signal detecting means for detecting a signal having an amplitude corresponding to the rotational speed of said motor, an amplitude control circuit which varies its output in compliance with the result of comparison between the output of said signal detecting means and a reference voltage, and a multiplying circuit for developing a pulse signal corresponding to the product of the pulse width obtained by said signal extracting means and the amplitude of the output signal developed by said amplitude control circuit, whereby said motor is synchronizingly driven by the pulse signal, the amplitude of which is changed in response to the rotational speed of the motor and the pulse width of which is varied in compliance with the difference between the reference input signal and the rotary phase of the motor.

4. Apparatus according to claim 1, and further comprising a motor for rotating said rotary magnetic pieces, the rotary magnetic pieces of said magnetic field vector detecting devices being disposed in series along the rotary axis of said motor, said apparatus having an angular position detecting device for detecting the rotated position of said rotary magnetic pieces, said angular position detector comprising a rotary plate disposed along the rotary axis and having a slit provided therein, light emitting and receiving elements which are disposed at both sides of said plate so as to face to each other, a circuit for performing peak detection of the output from said light receiving element, a circuit for generating a reference voltage in response to the output of said peak detection circuit, and a level slice circuit for performing a level slice operation in respect of the output of said peak detection circuit, whereby the output from said level slice circuit is used as the rotated position information of the rotary magnetic piece for determining the positional coordinates.

5. Apparatus accordingly to claim 1, wherein there are provided three magnetic field vector detecting devices.

6. Apparatus according to claim 5 wherein a plurality of difference signals are developed from the outputs of said plurality of magnetic field vector detecting devices by setting one of said outputs as a common subtrahend or a minuend to the others, and the magnetic field due to the magnetic body is calculated using the ratio of said difference signal and an arbitrary difference signal, thereby eliminating the influence of the magnetic field on said magnetic body.

7. Apparatus according to claim 1, wherein said arithmetic means comprises a DA converter which receives an analog signal from each said magnetic field vector detecting device as well as a digital signal consisting of the digital value for the crest value of a reference since wave and develops an output proportional to the product of said analog and digital input signals; an AD converter which performs AD conversion by means of integrating the output of said DA converter over a period equal to an integer multiple of said reference sine wave period; and a vector component arithmetic circuit which is adapted to obtain the digital value with respect to the preset phase component vector of the input signal from said AD converter.

8. Apparatus according to claim 1, wherein said inclination detecting device is provided with a magnet and a coil arranged so as to be subject to displacement when inclined, and supplies said coil with an electric current having a direction and magnitude sufficient to eliminate said displacement.

* * * * *